United States Patent
Shin et al.

(10) Patent No.: US 8,964,868 B2
(45) Date of Patent: Feb. 24, 2015

(54) METHOD AND APPARATUS FOR UPLINK POWER CONTROL IN MULTIPLE-INPUT MULTIPLE-OUTPUT

(75) Inventors: Sung-Hyuk Shin, Northvale, NJ (US); Philip J. Pietraski, Huntington Station, NY (US); Vincent Roy, Longueuil (CA); Guodong Zhang, Syosset, NY (US); Kyle Jung-Lin Pan, Smithtown, NY (US); Donald M. Grieco, Manhasset, NY (US); Janet A. Stern-Berkowitz, Little Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 568 days.

(21) Appl. No.: 12/725,713

(22) Filed: Mar. 17, 2010

(65) Prior Publication Data
US 2010/0246705 A1    Sep. 30, 2010

Related U.S. Application Data

(60) Provisional application No. 61/160,958, filed on Mar. 17, 2009.

(51) Int. Cl.
*H04L 27/28* (2006.01)
*H04W 52/42* (2009.01)
*H04B 7/04* (2006.01)
(Continued)

(52) U.S. Cl.
CPC ............ *H04W 52/42* (2013.01); *H04B 7/0413* (2013.01); *H04B 7/0689* (2013.01); *H04L 1/0003* (2013.01); *H04W 52/146* (2013.01); *H04B 7/024* (2013.01); *H04W 52/242* (2013.01); *H04W 52/40* (2013.01)

USPC ........... 375/267; 375/260; 370/311; 370/312; 370/329; 370/331; 370/343; 455/509

(58) Field of Classification Search
CPC ..... H04L 5/003; H04L 5/0064; H04B 7/0413
USPC .......... 375/260, 267; 370/312, 329, 331, 343, 370/311; 455/509
See application file for complete search history.

(56) References Cited

U.S. PATENT DOCUMENTS

| | | |
|---|---|---|
| 6,226,507 B1 | 5/2001 | Ramesh et al. |
| 7,269,436 B2 | 9/2007 | Won |

(Continued)

FOREIGN PATENT DOCUMENTS

WO    2008/055179    5/2008

OTHER PUBLICATIONS

Grieco, Donald, Pan, Jung-Lin, Olesen, Robert, and Shah, Nirav "Uplink Single-User MIMO for 3GPP LTE,"InterDigital Communications Corp., Melville, New York (2007).

(Continued)

*Primary Examiner* — Daniel Washburn
*Assistant Examiner* — Eboni Hughes
(74) *Attorney, Agent, or Firm* — Volpe and Koenig, P.C.

(57) ABSTRACT

A method and apparatus for uplink power control in multiple-input multiple-output (MIMO) includes adjusting a total uplink transmit power level with a power offset based on a number of antennas via which an uplink subframe is transmitted. The uplink power control formula may be altered to include an additional power offset term to compensate for a MIMO mode or an existing term may be adjusted to compensate for the MIMO mode.

28 Claims, 4 Drawing Sheets

(51) Int. Cl.
H04B 7/06 (2006.01)
H04L 1/00 (2006.01)
H04W 52/14 (2009.01)
H04B 7/02 (2006.01)
H04W 52/24 (2009.01)
H04W 52/40 (2009.01)

(56) References Cited

U.S. PATENT DOCUMENTS

| | | | |
|---|---|---|---|
| 8,064,394 B2* | 11/2011 | Jongren et al. | 370/329 |
| 8,391,219 B2* | 3/2013 | Ishii et al. | 370/329 |
| 2008/0081655 A1 | 4/2008 | Shin et al. | |
| 2008/0220806 A1* | 9/2008 | Shin et al. | 455/522 |
| 2009/0268675 A1 | 10/2009 | Choi | |
| 2010/0008216 A1 | 1/2010 | Li et al. | |
| 2010/0309870 A1* | 12/2010 | Wengerter et al. | 370/329 |
| 2010/0323711 A1 | 12/2010 | Damnjanovic et al. | |
| 2011/0013615 A1 | 1/2011 | Lee et al. | |
| 2011/0195735 A1* | 8/2011 | Irmer et al. | 455/509 |
| 2011/0207415 A1 | 8/2011 | Luo et al. | |
| 2011/0261774 A1* | 10/2011 | Lunttila et al. | 370/329 |
| 2012/0014349 A1 | 1/2012 | Chung et al. | |

OTHER PUBLICATIONS

IEEE Computer Society and the IEEE Microwave Theory and Techniques Society, "IEEE Standard for Local and Metropolitan Area Networks Part 16: Air Interface for Fixed Broadband Wireless Access Systems Amendment 2: Physical and Medium Access Control Layers for Combined Fixed and Mobile Operation in Licensed Bands and Corrigendum 1", IEEE Std 802.16e (2005).
LG Electronics, Ericsson, Panasonic, NTT DoCoMo, Nokia Siemens Network, Nokia, "Alignment of RAN1-RAN4 Specification on UE Maximum Output Power", 36.213 CR 0196, Rev. 1, v8.5.0; 3GPP TSG-RAN WG1 Meeting #55bis; R1-090430, Ljubljana, Slovenia, (Jan. 12-16, 2009).
Third Generation Partnership Project, "Technical Specification Group Radio Access Network; Evolved Universal Terrestrial Radio Access (E-UTRA); Physical Layer Procedures (Release 8)", 3GPP TS 36.213, V8.6.0 (Mar. 2008).
Third Generation Partnership Project, "Technical Specification Group Radio Access Network; Evolved Universal Terrestrial Radio Access (E-UTRA); Physical Layer Procedures (Release 8)", 3GPP TS 36.213, V8.8.0 (Sep. 2008).
Third Generation Partnership Project, "Technical Specification Group Radio Access Network; Evolved Universal Terrestrial Radio Access (E-UTRA); User Equipment (UE) Radio Transmission and Reception (Release 8)", 3GPP TS 36.101, V8.4.0, (Dec. 2008).
Third Generation Partnership Project, "Technical Specification Group Radio Access Network; Evolved Universal Terrestrial Radio Access (E-UTRA); User Equipment (UE) Radio Transmission and Reception (Release 8)", 3GPP TS 36.101, V8.5.0, (Mar. 2009).
Third Generation Partnership Project, "Technical Specification Group Radio Access Network; Evolved Universal Terrestrial Radio Access (E-UTRA); User Equipment (UE) Radio Transmission and Reception (Release 8)", 3GPP TS 36.101, V8.8.0, (Dec. 2009).
Third Generation Partnership Project, "Technical Specification Group Radio Access Network; Evolved Universal Terrestrial Radio Access (E-UTRA); User Equipment (UE) Radio Transmission and Reception (Release 9)", 3GPP TS 36.101, V9.2.0, (Dec. 2009).
Third Generation Partnership Project, "Technical Specification Group Radio Access Network; Physical layer procedures (TDD) (Release 8)", 3GPP TS 25.224 V8.5.0 (Sep. 2009).
Third Generation Partnership Project, "Technical Specification Group Radio Access Network; Physical layer procedures (TDD) (Release 8)", 3GPP TS 25.224 V8.3.0 (Mar. 2009).
Third Generation Partnership Project, "Technical Specification Group Radio Access Network; Physical layer procedures (TDD) (Release 8)", 3GPP TS 25.224 V9.0.0 (Dec. 2009).
Third Generation Partnership Project, "Technical Specification Group Radio Access Network; Physical layer procedures (TDD) (Release 8)", 3GPP TS 25.224 V8.6.0 (Dec. 2009).
Third Generation Partnership Project, "Technical Specification Group Radio Access Network; Physical layer procedures (TDD) (Release 7)", 3GPP TS 25.224 V7.10.0 (Mar. 2009).
Third Generation Partnership Project, "Technical Specification Group Radio Access Network; Evolved Universal Terrestrial Radio Access (E-UTRA); Physical Layer Procedures (Release 8)", 3GPP TS 36.213, V9.0.1 (Dec. 2009).
Third Generation Partnership Project, "Technical Specification Group Radio Access Network; Evolved Universal Terrestrial Radio Access (E-UTRA); Radio Resource Control (RRC); Protocol Specification (Release 8)", 3GPP TS 36.331, V8.4.0, (Dec. 2008).
Third Generation Partnership Project, "Technical Specification Group Radio Access Network; Evolved Universal Terrestrial Radio Access (E-UTRA); Radio Resource Control (RRC); Protocol Specification (Release 8)", 3GPP TS 36.331, V8.8.0, (Dec. 2009).
Third Generation Partnership Project, "Technical Specification Group Radio Access Network; Evolved Universal Terrestrial Radio Access (E-UTRA); Radio Resource Control (RRC); Protocol Specification (Release 9)", 3GPP TS 36.331, V9.1.0, (Dec. 2009).
Third Generation Partnership Project, "Technical Specification Group Radio Access Network; User Equipment (UE) radio transmission and reception (FDD) (Release 7)", 3GPP TS 25.101 V7.14.0 . (Dec. 2008).
Grieco, Donald, Pan, Jung-Lin, Olesen, Robert, and Shah, Nirav "Uplink Single-User MIMO for 3GPP LTE," InterDigital Communcations Corp., Melville, New York (2007).
IEEE Computer Society and the IEEE Microwave Theory and Techniques Society, "IEEE Draft Amendment to IEEE Standard for Local and Metropolitan Area Networks Part 16: Air Interface for Fixed Broadband Wireless Access Systems", IEEE Std 802.16m (Mar. 2008).
IEEE Computer Society and the IEEE Microwave Theory and Techniques Society, "IEEE Standard for Local and Metropolitan Area Networks Part 16: Air Interface for Fixed Broadband Wireless Access Systems Amendment 2: Physical and Medium Access Control Layers for Combined Fixed and Moble Operation in Licensed Bands and Corrigendum 1", IEEE Std 802.16e (2005).
InterDigital Communications LLC, "CM Analysis of UL Transmission for LTE-A", Agenda Item 12, 3GPP TSG-RAN WG1 #54; R1-082807, Jeju, Korea, (Aug. 18-22, 2008).
Kim et al., "Uplink Power Control Design—Considerations and Mechanism," S802.16m-08/813 (Jul. 16, 2008).
Kim et al.,"Proposed Text on Power Control Section for the IEEE 802.16m Amendment," IEEE 802.16 Broadband Wireless Access Working Group, IEEE C802.16m-09/ 0634(Mar. 2, 2009).
LG Electronics, Discussion on Fall-Back Mode in Uplink, 3GPP TSG Ran WG1 #57bis, Agenda Item 15.5, R1-092512, Los Angeles, USA (Jun. 29-Jul. 3, 2009).
LG Electronics, "PUCCH Piggybacking Onto PUSCH in Case of Transmit Power Limitation", Agenda Item 12.1, 3GPP TSG RAN WG1 #56; R1-090654, Athens, Greece, (Feb. 9-13, 2009).
LG Electronics, "Uplink Multiple Channel Transmission in Case of UE Transmit Power Limitation", Agenda Item 12.1, 3GPP TSG RAN WG1 #56; R1-090655, Athens, Greece, (Feb. 9-13, 2009).
LG Electronics, Ericsson, Panasonic, NTT DoCoMo, Nokia Siemens Network, Nokia, "Alignment of RAN1/RAN4 Specification on UE Maximum Output Power", 36.213 CR 0196, Rev. 1, v8.5.0; 3GPP TSG-RAN WG1 Meeting #55bis; R1-090430, Ljubljana, Slovenia, (Jan. 12-16, 2009).
LG Electronics, et al. Way Forward for PUCCH Transmit Diversity Scheme, 3GPP TSG RAN WG1 #58,R1-093704, Shenzhen, China (Aug. 23-28, 2009).
Qualcomm Europe, "Aspects to Consider for DL Transmission Schemes of LTE-A", Agenda Item 11.3, 3GPP TSG-RAN WG1 Meeting #55; R1-084398, Prague, Czech Republic, (Nov. 10-14, 2008).
Qualcomm Europe, "CM Analysis of Concurrent PUSCH and PUCCH UL Transmission for LTE-A", Agenda Item 12.1, 3GPP TSG RAN WG1 Meeting #55bis; R1-090363, Ljubljana, Slovenia, (Jan. 12-16, 2009).

(56) References Cited

OTHER PUBLICATIONS

Qualcomm Europe, "Support of Concurrent Transmission of PUCCH and PUSCH in LTE-A Uplink", Agenda Item 12.1, 3GPP TSG RAN WG1Meeting #55bis; R1-090362, Ljubljana, Slovenia, (Jan. 12-16, 2009).
Samsung, "Concurrent PUSCH and PUCCH Transmissions", Agenda Item 12.1, 3GPP TSG RAN WG1 #56; R1-090611, Athens, Greece, (Feb. 9-13, 2009).
Texas Instruments, "Further Analysis on Uplink SU-MIMO for E-UTRA," 3GPP TSG RAN WG1 #56, R1-090588 (Feb. 9-13, 2009).
Third Generation Partnership Project, "Technical Specification Group Radio Access Network; Evolved Universal Terrestrial Radio Access (E-UTRA); Physical Layer Procedures (Release 8)", 3GPP TS 36.213, V8.5.0 (Dec. 2008).
Third Generation Partnership Project, "Technical Specification Group Radio Access Network; Evolved Universal Terrestrial Radio Access (E-UTRA); Physical Layer Procedures (Release 8)", 3GPP TS 36.213, V8.6.0 (Mar. 2009).
Third Generation Partnership Project, "Technical Specification Group Radio Access Network; Evolved Universal Terrestrial Radio Access (E-UTRA); Physical Layer Procedures (Release 8)", 3GPP TS 36.213, V8.8.0 (Sep. 2009).
Third Generation Partnership Project, "Technical Specification Group Radio Access Network; Evolved Universal Terrestrial Radio Access (E-UTRA); Physical Layer Procedures (Release 9)", 3GPP TS 36.213, V9.0.1 (Dec. 2009).
Third Generation Partnership Project, "Technical Specification Group Radio Access Network; Evolved Universal Terrestrial Radio Access (E-UTRA); User Equipment (UE) Radio Transmission and Reception (Release 8)", 3GPP TS 36.101, V8.4.0 (Dec. 2008).
Third Generation Partnership Project, "Technical Specification Group Radio Access Network; Evolved Universal Terrestrial Radio Access (E-UTRA); User Equipment (UE) Radio Transmission and Reception (Release 8)", 3GPP TS 36.101, V8.5.0 (Mar. 2009).
Third Generation Partnership Project, "Technical Specification Group Radio Access Network; Evolved Universal Terrestrial Radio Access (E-UTRA); User Equipment (UE) Radio Transmission and Reception (Release 8)", 3GPP TS 36.101, V8.8.0 (Dec. 2009).
Third Generation Partnership Project, "Technical Specification Group Radio Access Network; Evolved Universal Terrestrial Radio Access (E-UTRA); User Equipment (UE) Radio Transmission and Reception (Release 9)", 3GPP TS 36.101, V9.2.0 (Dec. 2009).
Third Generation Partnership Project, "Technical Specification Group Radio Access Network; Further Advancements for E-UTRA Physical Layer Aspects (Release 9)", 3GPP TR 36.814, V0.4.1, (Feb. 2009).
Third Generation Partnership Project, "Technical Specification Group Radio Access Network; Further Advancements for E-UTRA Physical Layer Aspects (Release 9)", 3GPP TR 36.814, V1.5.0, (Nov. 2009).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.4.0, (Dec. 2008).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V8.8.0, (Dec. 2009).
Third Generation Partnership Project, "Technical Specification Group Radio Access Network; Evolved Universal Terrestrial Radio Access (E-UTRA) Radio Resource Control (RRC); Protocol Specification (Release 8)", 3GPP TS 36.331, V9.1.0, (Dec. 2009).
Third Generation Partnership Project, "Technical Specification Group Radio Access Network; User Equipment (UE) radio transmission and reception (FDD) (Release 6)", 3GPP TS 25.101 V6.8.0 (Jun. 2005).
Third Generation Partnership Project, "Technical Specification Group Radio Access Network; User Equipment (UE) radio transmission and reception (FDD) (Release 6)", 3GPP TS 25.101 V6.18.0 (Sep. 2008).
Third Generation Partnership Project, "Technical Specification Group Radio Access Network; User Equipment (UE) radio transmission and reception (FDD) (Release 6)", 3GPP TS 25.101 V6.19.0 (Mar. 2009).
Third Generation Partnership Project, "Technical Specification Group Radio Access Network; User Equipment (UE) radio transmission and reception (FDD) (Release 7)", 3GPP TS 25.101 V7.14.0 (Dec. 2008).
Third Generation Partnership Project, "Technical Specification Group Radio Access Network; User Equipment (UE) radio transmission and reception (FDD) (Release 7)", 3GPP TS 25.101 V7.15.0 (Mar. 2009).
Third Generation Partnership Project, "Technical Specification Group Radio Access Network; User Equipment (UE) radio transmission and reception (FDD) (Release 7)", 3GPP TS 25.101 V7.17.0 (Dec. 2009).
Third Generation Partnership Project, "Technical Specification Group Radio Access Network; User Equipment (UE) radio transmission and reception (FDD) (Release 8)", 3GPP TS 25.101 V8.5.1 (Jan. 2009).
Third Generation Partnership Project, "Technical Specification Group Radio Access Network; User Equipment (UE) radio transmission and reception (FDD) (Release 6)", 3GPP TS 25.101 V8.6.0 (Mar. 2009).
Third Generation Partnership Project, "Technical Specification Group Radio Access Network; User Equipment (UE) radio transmission and reception (FDD) (Release 8)", 3GPP TS 25.101 V8.9.0 (Dec. 2009).
Third Generation Partnership Project, "Technical Specification Group Radio Access Network; User Equipment (UE) radio transmission and reception (FDD) (Release 9)", 3GPP TS 25.101 V9.2.0 (Dec. 2009).
Third Generation Partnership Project, "Technical Specification Group Radio Access Network; Physical layer procedures (TDD) (Release 8), " 3GPP TS 25.224 V8.5.0 (Sep. 2009).
Third Generation Partnership Project, "Technical Specification Group Radio Access Network; Physical layer procedures (TDD) (Release 8), " 3GPP TS 25.224 V8.3.0 (Mar. 2009).
Third Generation Partnership Project, "Technical Specification Group Radio Access Network; Physical layer procedures (TDD) (Release 9), " 3GPP TS 25.224 V9.0.0 (Dec. 2009).
Third Generation Partnership Project, "Technical Specification Group Radio Access Network; Physical layer procedures (TDD) (Release 8), " 3GPP TS 25.224 V8.6.0 (Dec. 2009).
Third Generation Partnership Project, "Technical Specification Group Radio Access Network; Physical layer procedures (TDD) (Release 7), " 3GPP TS 25.224 V7.10.0 (Mar. 2009).
Third Generation Partnership Project, "Technical Specification Group Radio Access Network; Evolved Universal Terrestrial Radio Access (E-UTRA) Medium Access Control (MAC) protocol specification (Release 8), " 3GPP TS 36.321 V8.8.0 (Dec. 2009).
Third Generation Partnership Project, "Technical Specification Group Radio Access Network; Evolved Universal Terrestrial Radio Access (E-UTRA) Medium Access Control (MAC) protocol specification (Release 9), " 3GPP TS 36.321 V9.1.0 (Dec. 2009).
Third Generation Partnership Project, "Technical Specification Group Radio Access Network; Evolved Universal Terrestrial Radio Access (E-UTRA) Medium Access Control (MAC) protocol specification (Release 8), " 3GPP TS 36.321 V8.4.0 (Dec. 2008).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.6.0 (Mar. 2009).
Third Generation Partnership Project, "Technical Specification Group Radio Access Network; Evolved Universal Terrestrial Radio Access (E-UTRA); Physical Channels and Modulation (Release 8)," 3GPP TS 36.211 V8.9.0 (Dec. 2009).
Third Generation Partnership Project, "Technical Specification Group Radio Access Network; Evolved Universal Terrestrial Radio

(56) References Cited

OTHER PUBLICATIONS

Access (E-UTRA); Physical Channels and Modulation (Release 9)," 3GPP TS 36.211 V9.0.0 (Dec. 2009).

Grieco, Donald, Pan, Jung-Lin, Olesen, Robert, and Shah, Nirav "Uplink Single-User MIMO for 3GPP LTE," InterDigital Communications Corp., Melville, New York (2007).

IEEE Computer Society and the IEEE Microwave Theory and Techniques Society, " IEEE Standard for Local and Metropolitan Area Networks Part 16: Air Interface for Fixed Broadband Wireless Access Systems Amendment 2: Physical and Medium Access Control Layers for Combined Fixed and Mobile Operation in Licensed Bands and Corrigendum 1", IEEE Std 802.16e (2005).

Kim et al.,"Proposed Text on Power Control Section for the IEEE 802.16m Amendment," IEEE 802.16 Broadband Wireless Access Working Group, IEEE C802.16m-09/ 0634 (Mar. 2, 2009).

LG Electronics, "PUCCH Piggybacking Onto PUSCH in Case of Transmit Power Limitation", Agenda Item 12.1, 3GPP TSG RAN WG1 ™56; R1-090654, Athens, Greece, (Feb. 9-13, 2009).

Third Generation Partnership Project, "Technical Specification Group Radio Access Network; Evolved Universal Terrestrial Radio Access (E-UTRA); User Equipment (UE) Radio Transmission and Reception (Release 0)", 3GPP TS 36.101, V9.2.0, (Dec. 2009).

Third Generation Partnership Project, "Technical Specification Group Radio Access Network; Evolved Universal Terrestrial Radio Access (E-UTRA) Radio Resource Control (RRC); Protocol Specification (Release 9)", 3GPP TS 36.331, V9.1.0, (Dec. 2009).

Third Generation Partnership Project, "Technical Specification Group Radio Access Network; User Equipment (UE) radio transmission and reception (FDD) (Release 8)", 3GPP TS 25.101 V8.6.0 (Mar. 2009).

Third Generation Partnership Project, "Technical Specification Group Radio Access Network; Physical layer procedures (TDD) (Release 8)," 3GPP TS 25.224 V8.5.0 (Sep. 2009).

Third Generation Partnership Project, "Technical Specification Group Radio Access Network; Physical layer procedures (TDD) (Release 8)," 3GPP TS 25.224 V8.3.0 (Mar. 2009).

Third Generation Partnership Project, "Technical Specification Group Radio Access Network; Physical layer procedures (TDD) (Release 9)," 3GPP TS 25.224 V9.0.0 (Dec. 2009).

Third Generation Partnership Project, "Technical Specification Group Radio Access Network; Physical layer procedures (TDD) (Release 8)," 3GPP TS 25.224 V8.6.0 (Dec. 2009).

Third Generation Partnership Project, "Technical Specification Group Radio Access Network; Physical layer procedures (TDD) (Release 7)," 3GPP TS 25.224 V7.10.0 (Mar. 2009).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.8.0 (Dec. 2009).

Third Generation Partnership Project, "Technical Specification Group Radio Access Network; Evolved Universal Terrestrial Radio Access (E-UTRA) Medium Access Control (MAC) protocol specification (Release 9)," 3GPP TS 36.321 V9.1.0 (Dec. 2009).

Third Generation Partnership Project, "Technical Specification Group Radio Access Network; Evolved Universal Terrestrial Radio Access (E-UTRA) Medium Access Control (MAC) protocol specification (Release 8)," 3GPP TS 36.321 V8.4.0 (Dec. 2008).

Motorola, "Multi-Antenna Support in UL PUSCH/PUCCH/ PRACH/SRS Transmission," 3GPP TSG RAN1#57bis, R1-092644 (Jun. 29-Jul. 3, 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.7.0 (Dec. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.11.0 (Dec. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.2.0 (Dec. 2009).

* cited by examiner

METHOD AND APPARATUS FOR UPLINK POWER CONTROL IN MULTIPLE-INPUT MULTIPLE-OUTPUT

CROSS REFERENCE TO RELATED APPLICATIONS

This application claims the benefit of U.S. provisional application No. 61/160,958 filed Mar. 17, 2009, which is incorporated by reference as if fully set forth herein.

FIELD OF INVENTION

This application is related to wireless communications.

BACKGROUND

Long Term Evolution (LTE) supports higher data rates and spectrum efficiency. LTE uses Single Carrier Frequency Division Multiple Access (SC-FDMA) for transmission in the uplink (UL) direction. LTE implements SC-FDMA as Discrete Fourier Transform Spread Orthogonal Frequency Division Multiplexing (DFT-S-OFDM. A wireless transmit/receive unit (WTRU) in the UL may transmit on a limited, contiguous set of assigned sub-carriers in a Frequency Division Multiple Access (FDMA) arrangement. For purposes of illustration, if the overall Orthogonal Frequency Division Multiplexing (OFDM) signal or system bandwidth in the UL is composed of useful sub-carriers numbered 1 to 100, a first WTRU would be assigned to transmit its own signal on sub-carriers 1-12, a second given WTRU would be assigned to transmit on sub-carriers 13-24, and so on. A base station, such as an evolved NodeB (eNB), may receive the composite UL signal across the entire transmission bandwidth from one or more WTRUs at the same time, but each WTRU may transmit into a subset of the available transmission bandwidth. DFT-S OFDM has the additional constraint that the time-frequency resource assigned to a WTRU may consist of a set of frequency-consecutive sub-carriers.

In LTE UL, WTRUs may transmit their data (and in some cases their control information) on the physical uplink shared channel (PUSCH). The transmission of the PUSCH is scheduled and controlled by the eNodeB using the so-called uplink scheduling grant, which is carried on the physical downlink control channel (PDCCH) format 0. As part of the uplink scheduling grant, the WTRU receives control information on the modulation and coding set (MCS), transmit power control (TPC) command, uplink resources allocation (i.e., the indices of allocated resource blocks), and other similar parameters. The WTRU may then transmit its PUSCH on the allocated uplink resources with the corresponding MCS at the transmit power set by the TPC command.

The transmit power of the WTRU may be determined at the WTRU based on measurements made by the WTRU and the data received from the base station as stated above. WTRU transmit power control may be important for maintaining QoS (Quality of Service), controlling inter-cell interference, and maximizing a terminal's battery life.

LTE-Advanced (LTE-A) supports bandwidth extension using carrier aggregation, UL multiple-input multiple-output (MIMO), simultaneous PUSCH and physical uplink control channel (PUCCH) transmission, and multiple transmit antennas (e.g., up to at least 4 antennas) that may have two codewords (transport blocks) per UL component carrier. Each of these features impacts on WTRU transmit power control.

SUMMARY

A method and apparatus for uplink power control in multiple-input multiple-output (MIMO) is disclosed. The method includes setting a transmit power level for a physical uplink shared channel (PUSCH) transmission based on MIMO transmission mode.

BRIEF DESCRIPTION OF THE DRAWINGS

A more detailed understanding may be had from the following description, given by way of example in conjunction with the accompanying drawings wherein.

DETAILED DESCRIPTION

Figure 1:
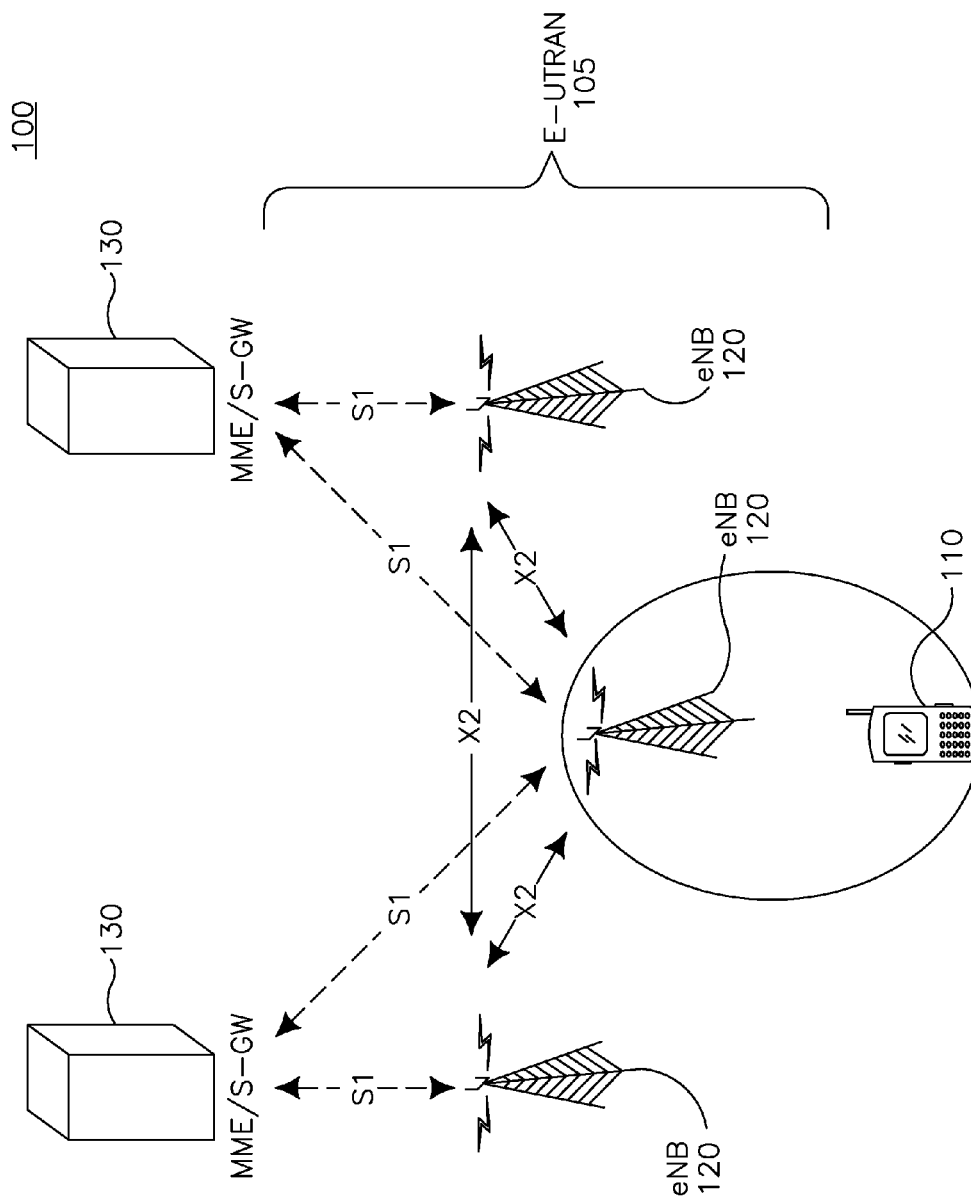
FIG. 1 shows an example wireless communication system including a plurality of wireless transmit/receive units (WTRUs) and an evolved Node B (eNB)

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a Node-B, a site controller, an access point (AP), or any other type of interfacing device capable of operating in a wireless environment.

Although the uplink (UL) power control description herein refers to Long Term Evolution Advanced (LTE-A), it is applicable to other packetized, (Orthogonal Frequency Division Multiplexing OFDM) or OFDM-like air interface technologies. In general, UL power control determines the average power over a Discrete Fourier Transform Spread Orthogonal Frequency Division Multiplexing (DFT-SOFDM) symbol in which the physical channel is transmitted and controls the transmit power of the different uplink physical channels.

In general, LTE UL power control compensates for long-term fading (including pathloss and shadowing) while reducing inter-cell interference, and maintaining received power (or signal-to-noise (SNR)) at a desired target power (or SNR). Similarly, LTE-A UL power control may use combined open loop and closed loop power control to compensate for the above factors in addition to issues related to carrier aggregation, UL MIMO, simultaneous PUSCH and physical uplink control channel (PUCCH) transmission, and multiple transmit antennas (e.g., up to at least 4 antennas) that may have two codewords (transport blocks) per UL component carrier.

LTE power control is predicted on the WTRU transmitting UL signal using only one transmit antenna. LTE-A may support multiple WTRU transmit antennas (e.g., at least up to 4). For PUSCH transmission in LTE-A, there may be several MIMO transmission modes including precoding based spatial multiplexing (SM) SM-MIMO, Tx diversity, and single antenna port transmission. The WTRU may be configured by the eNB to use a particular MIMO transmission mode for PUSCH transmission. Typically, different MIMO transmission modes may have different MIMO/antenna gains. For example, the MIMO gain (e.g., transmitter (Tx) diversity gain) of a Tx diversity mode, for example, Space Time Transmit Diversity (STTD), may be about 3 dB, as compared with a single antenna transmission mode, while the beamforming (BF) MIMO transmission mode may provide a different MIMO gain than a Tx diversity MIMO transmission mode.

Accordingly, for a given total WTRU transmit power level, the eNB may receive UL signals at different power levels for different MIMO transmission modes. In order to maintain the received power (or SNR) of UL signals in MIMO at a same target power (or SNR), the WTRU adjusts the transmit power as described herein when MIMO transmission mode is changed/reconfigured. LTE-A UL power control in MIMO as described herein may compensate for different MIMO gains for various UL MIMO transmission modes including SM-MIMO, Tx Diversity, BF, and Coordinated Multi-Point Transmission/Reception (CoMP). Moreover, LTE-A power control as described herein may include power adjustments for UL MIMO rank adaptation.

UL spatial multiplexing of up to at least four layer is supported by LTE-A. In UL single user spatial multiplexing, up to two transport blocks (codewords) may be transmitted from a scheduled WTRU in a subframe per UL component carrier. Each transport block has its own MCS level. Depending on the number of layers (ranks), the modulation symbols associated with each of the transport blocks may be mapped to one or two layers according to a predefined rule. The transmission rank may be adapted dynamically. Each transport block (or each layer) may experience different MIMO channel conditions than the other transport blocks (or other layers). Accordingly, the WTRU may set the transmit power of each transport block (or layer) using the methods describe herein.

In the case of two codeword transmissions in SM-MIMO, the open loop component (including pathloss) of uplink TPC may be common to the two codewords, however the closed loop component (such as the TPC command) and/or other UL power control parameters may be different between the two codewords, as the individual codewords may require different quality targets, may be received with different signal to interference-plus-noise ratio (SINRs) at the eNB, and/or may be transmitted from two separate power amplifiers. Described herein are methods for setting the power levels of the two codewords.

FIG. 1 shows a Long Term Evolution (LTE) wireless communication system/access network 100 that includes an Evolved-Universal Terrestrial Radio Access Network (E-UTRAN) 105. The E-UTRAN 105 includes several evolved Node-Bs, (eNBs) 120. The WTRU 110 is in communication with an eNB 120. The eNBs 120 interface with each other using an X2 interface. Each of the eNBs 120 interface with a Mobility Management Entity (MME)/Serving GateWay (S-GW) 130 through an S1 interface. Although a single WTRU 110 and three eNBs 120 are shown in FIG. 1, it should be apparent that any combination of wireless and wired devices may be included in the wireless communication system access network 100.

Figure 2:
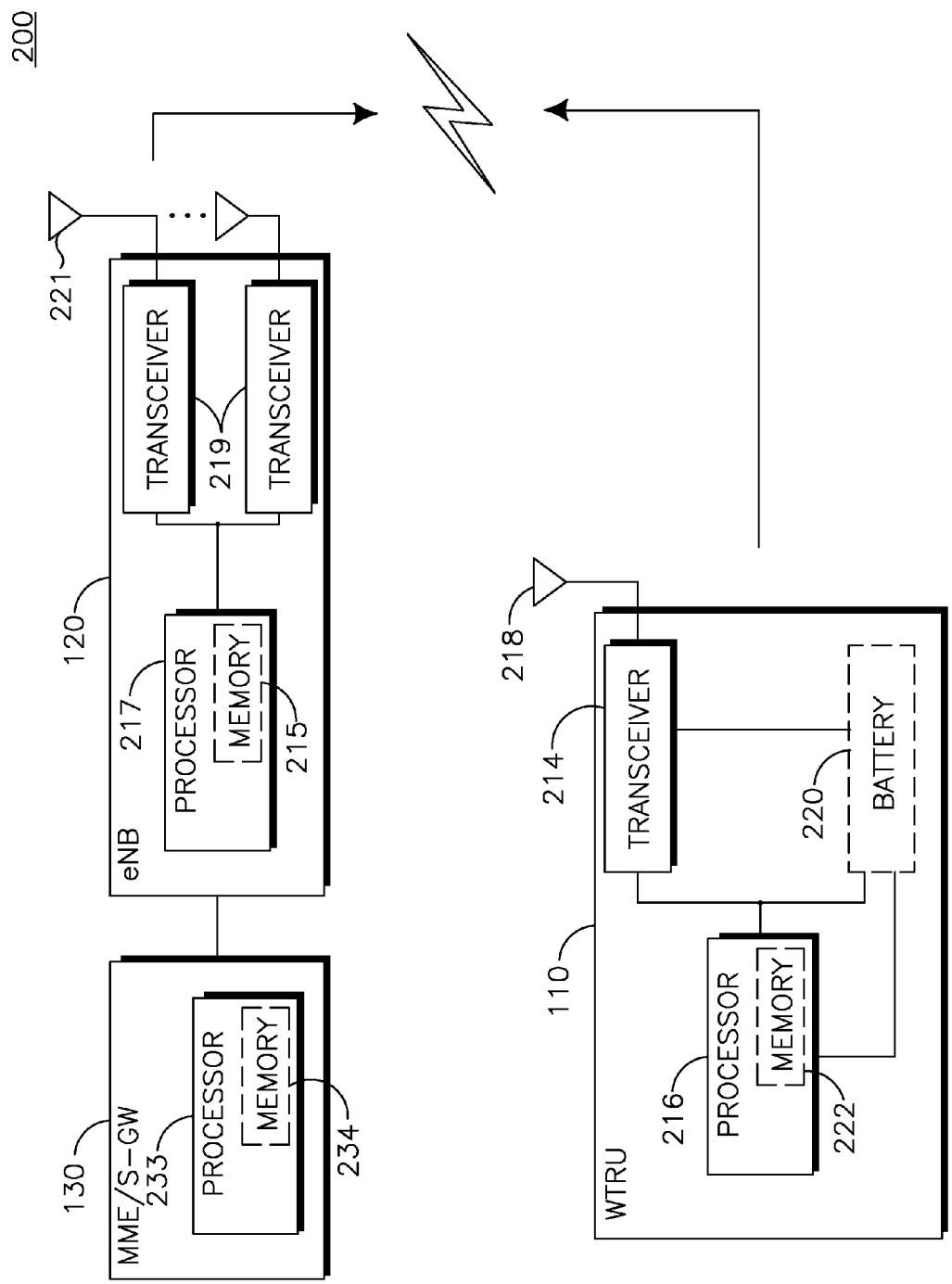
FIG. 2 shows an example functional block diagram of a WTRU and eNB of FIG. 1.

FIG. 2 is an example block diagram of an LTE wireless communication system 200 including the WTRU 110, the eNB 120, and the MME/S-GW 130. As shown in FIG. 2, the WTRU 110, the eNB 120 and the MME/S-GW 130 are configured to perform a method of uplink power control for multiple-input multiple-output systems.

In addition to the components that may be found in a typical WTRU, the WTRU 110 includes a processor 216 with an optional linked memory 222, at least one transceiver 214, an optional battery 220, and an antenna 218. The processor 216 is configured to perform a method of uplink power control for multiple-input multiple-output systems. The transceiver(s) 214 is in communication with the processor 216 and antenna(s) 218 to facilitate the transmission and reception of wireless communications. In case a battery 220 is used in the WTRU 110, it powers the transceiver(s) 214 and the processor 216.

In addition to the components that may be found in a typical eNB, the eNB 120 includes a processor 217 with an optional linked memory 215, transceiver(s) 219, and antenna(s) 221. The processor 217 is configured to perform a method of uplink power control for multiple-input multiple-output systems. The transceiver(s) 219 are in communication with the processor 217 and antenna(s) 221 to facilitate the transmission and reception of wireless communications. The eNB 120 is connected to the Mobility Management Entity/Serving GateWay (MME/S-GW) 130 which includes a processor 233 with an optional linked memory 234.

Figure 3:
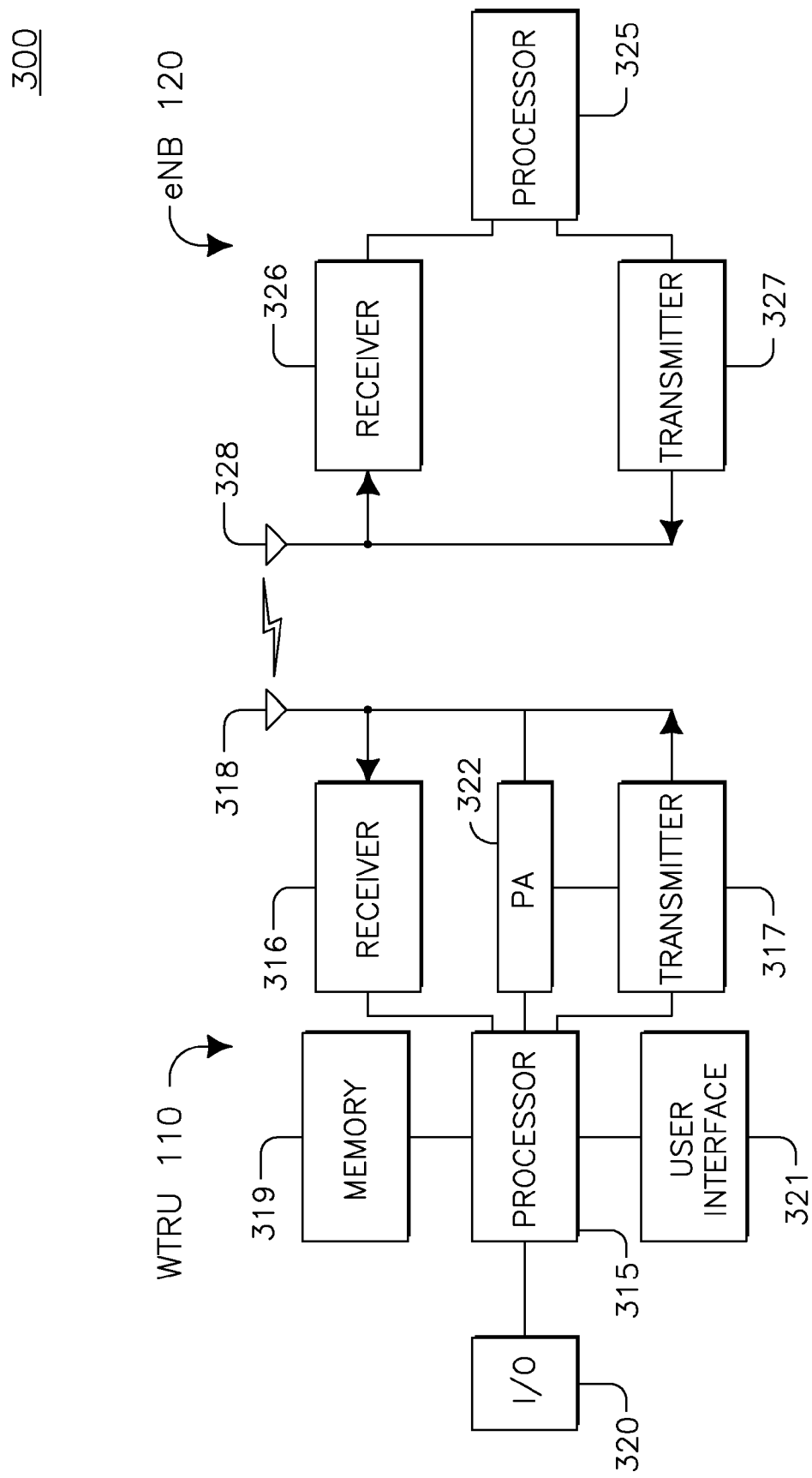
FIG. 3 shows another example functional block diagram of a WTRU and eNB of FIG. 1.

FIG. 3 is a functional block diagram 300 of the WTRU 110 and the eNB 120 of the wireless communication system 100 of FIG. 1. As shown in FIG. 1, the WTRU 110 is in communication with the eNB 120 are configured to perform a method of uplink power control for multiple-input multiple systems.

In addition to the components that may be found in a typical WTRU, the WTRU 110 includes a processor 315, a receiver 316, a transmitter 317, and an antenna module 318. The WTRU 110 may also include a user interface 321, which may include, but is not limited to, an LCD or LED screen, a touch screen, a keyboard, a stylus, or any other typical user interface device. The WTRU 110 may also include memory 319, both volatile and non-volatile as well as input/output interfaces 320 to other WTRUs, such as USB ports, serial ports and the like. The receiver 316 and the transmitter 317 are in communication with the processor 315. The antenna module 318 is in communication with both the receiver 316 and the transmitter 317 to facilitate the transmission and reception of wireless data. The antenna module 318 may include one or more antennas. The WTRU 110 may also include a power amplifier module 322 that is in communication with the processor 315 and transmitter 317. The power amplifier module 322 may include a single or multiple power amplifiers. The power amplifier module 322 may alternatively be located in the transmitter 317.

In addition to the components that may be found in a typical eNB, the eNB 120 includes a processor 325, a receiver 326, a transmitter 327, and an antenna module 328. The receiver 326 and the transmitter 327 are in communication with the processor 325. The antenna module 328 is in communication with both the receiver 326 and the transmitter 327 to facilitate the transmission and reception of wireless data. The antenna module 328 may include one or more multiple antennas.

Described herein are power control methods in various UL MIMO transmission modes. LTE-A UL may support several MIMO transmission modes such as closed loop spatial multiplexing (SM) single user (SU) SU-MIMO of up to four layers (with up to two transport blocks/codewords), multiple user (MU) MIMO, Tx diversity, BF, single antenna port transmission, and other MIMO transmission modes. In this case, the transmit power levels required for the individual MIMO transmission modes may be different, as different MIMO transmission modes may have different antenna/MIMO gains. Accordingly, the LTE UL power control formula may need a MIMO transmission mode factor as described herein to account for at least the different antenna/MIMO gains.

Assuming a single transport block (i.e., one codeword) per subframe, the setting of the WTRU transmit power for the physical uplink shared channel (PUSCH) transmission in subframe i may be defined as follows:

$$P_{PUSCH}(i) = \min\{P_{CMAX}, 10\log_{10}(M_{PUSCH}(i) + P_{O\_PUSCH}(j) + \alpha(j) \cdot PL + \Delta_{TF}(i) + f(i) + \Delta_{MIMO}(j)\} \quad (1)$$

In Equation (1), all parameters are as defined in LTE, except for $\Delta_{MIMO}(j)$, which is a MIMO transmission mode power offset or MIMO transmission mode factor for PUSCH. $\Delta_{MIMO}(j)$ is WTRU specific, depending on the MIMO transmission mode applied for in the PUSCH transmission for the WTRU. For PUSCH (re)transmissions corresponding to a semi-persistent scheduled grant, j=0; for PUSCH (re)transmissions corresponding to a dynamic scheduled grant, j=1; and for PUSCH (re) transmissions corresponding to the random access response grant, j=2 and where $\Delta_{MIMO}(2)=0$. $\Delta_{MIMO}(j)$ may be independent of the index j such that $\Delta_{MIMO}=\Delta_{MIMO}(j)$ for j=0, 1,2.

For a given MIMO transmission mode, there are several methods by which the WTRU may obtain the MIMO transmission mode power offset. The MIMO transmission mode power offset, $\Delta_{MIMO}(j)$, may be provided by higher layers, such as by using a lookup table provided via semi-static signaling or specified in the standards specifications (therefore does not need any signaling) (i.e., predefined). For purposes of illustration, Table 1 shows an example lookup table for $\Delta_{MIMO}(j)$ for some chosen j and 2 possible antenna configuration (2 and 4 antennas). The entries in the table may be cell specific (e.g., provided by system information blocks (SIBs)), WTRU specific (e.g., provided by radio resource controller (RRC) signaling) or fixed.

TABLE 1

| MIMO transmission mode | $\Delta_{MIMO}$ (dB) 2 antennas | $\Delta_{MIMO}$ (dB) 4 antennas |
|---|---|---|
| Closed loop SM-MIMO | $\Delta_1$ | $\Delta_5$ |
| Tx Diversity | $\Delta_2$ | $\Delta_6$ |
| BF/Single antenna port Tx mode | $\Delta_3$ | $\Delta_7$ |
| MIMO in UL CoMP | $\Delta_4$ | $\Delta_8$ |

For example, $\Delta_1$ and $\Delta_2$ could be 1 and −3 dB, respectively and $\Delta_3$ could be 0 dB. If a lookup table is used for $\Delta_{MIMO}(j)$, it may be the same for all WTRUs and may be broadcast. In this case, the WTRU selects from the lookup table a value of $\Delta_{MIMO}(j)$ corresponding to the MIMO transmission mode in use.

Alternatively, the base station may signal a value(s) of $\Delta_{MIMO}(j)$ to a WTRU, where the value(s) is a function of the MIMO transmission mode and j. For example, for a given MIMO transmission mode and j, $\Delta_{MIMO}(j)$ may be signaled via RRC signaling, L1 signaling or other higher layer signaling.

Alternatively, the value of $\Delta_{MIMO}(j)$ may be absorbed in $P_{O\_PUSCH}(j)$ (e.g., $P_{O\_UE\_PUSCH}(j)$). In this case, the range of $P_{O\_PUSCH}(j)$ or $P_{O\_UE\_PUSCH}(j)$ may need to be revised accordingly.

If accumulation transmit power control (TPC) command is enabled for a WTRU (based on the WTRU-specific parameter Accumulation-enabled provided by higher layers), then when a MIMO transmission mode is reconfigured for the WTRU from one mode to another mode, the WTRU may reset or adjust the state of the accumulation function, f(i), in Equation (1), e.g., the power control algorithm may be adjusted to account for how recent the available information in the accumulation function is, and reset or load f(i) with a value that is based on the previous state of f(i) when it was last used for this MIMO transmission mode and the time since it was last used, i.e., depending on the time since it was last used, the WTRU decides whether using a value or not is still valid.

Described herein are example power control methods using rank adaptation. In closed loop UL SM-MIMO, the transmission rank may be adapted dynamically. When rank for a WTRU is changed (from a higher rank to a lower rank or vice versa, e.g., from rank 2 to rank 1 or from rank 1 to rank 2), the effective antenna/MIMO gain for a transport block (codeword) may be changed accordingly. In this case, it is desirable for the WTRU to adjust the transmit power of the transport block (codeword) such that the received power (or SNR) of the transport block remains in the vicinity of a target power (or SNR).

For instance, when rank for a WTRU is switched from Rank 2 to Rank 1 (e.g., due to a channel condition change in spatial correlation), typically, without adjustment of the power control algorithm, the effective transmit power per information bit (or coded bit) for Rank 1 may be higher than that for Rank 2 (like x dB higher). In this case, in order to reduce the interference (for the case of higher rank to lower rank) to other WTRU(s) in neighboring cells or meet the target requirement (for the case of lower rank to higher rank), the WTRU transmit power may need to be adjusted accordingly. This adjustment may be done with the TPC command sent from the base station, however, this type of adjustment takes time to converge. Alternatively, the MIMO offset parameter, $\Delta_{MIMO}$, may be applied as in Equation (1) where the lookup table may be extended for the rank adaptation case and the benefit of immediate mode based power adaptation is realized. For illustration purposes this is shown in Table 2 for some chosen j and possibly different antenna configuration (2, 3, and 4 antennas). The entries in the table may be cell specific (e.g., provided by SIBs), WTRU specific (e.g., provided by RRC signaling) or fixed. For a given MIMO transmission mode, some of the entries in the table, corresponding to different numbers of antennas, may be the same (e.g., $\Delta_{62}=\Delta_{63}=\Delta_{64}$). Alternatively, the base station may signal a value(s) of $\Delta_{MIMO}(j)$ to a WTRU, where the value(s) is a function of the MIMO transmission mode and j. For example, for a given MIMO transmission mode (and rank in closed loop SM-MIMO) and j, $\Delta_{MIMO}(j)$ may be signaled via RRC signaling, L1 signaling or other higher layer signaling.

TABLE 2

| MIMO transmission mode | $\Delta_{MIMO}$ (dB) 2 antennas | $\Delta_{MIMO}$ (dB) 3 antennas | $\Delta_{MIMO}$ (dB) 4 antennas |
|---|---|---|---|
| Closed loop SM-MIMO: Rank1 | $\Delta_{12}$ | $\Delta_{13}$ | $\Delta_{14}$ |
| Closed loop SM-MIMO: Rank2 | $\Delta_{22}$ | $\Delta_{23}$ | $\Delta_{24}$ |
| Closed loop SM-MIMO: Rank3 | | $\Delta_{33}$ | $\Delta_{34}$ |
| Closed loop SM-MIMO: Rank4 | | | $\Delta_{44}$ |
| Tx Diversity | $\Delta_{52}$ | $\Delta_{53}$ | $\Delta_{54}$ |
| BF/Single antenna port mode | $\Delta_{62}$ | $\Delta_{63}$ | $\Delta_{64}$ |
| MIMO in UL CoMP | $\Delta_{72}$ | $\Delta_{73}$ | $\Delta_{74}$ |

If accumulation TPC command is enabled for a WTRU (based on the WTRU-specific parameter Accumulation-enabled provided by higher layers), then when rank is changed (e.g., rank 2 to rank 1), the WTRU may reset or adjust the state of the accumulation function, f(i), in Equation (1), e.g., the power control algorithm may be adjusted to account for how recent the available information in the accumulation function is, and reset or load f(i) with a value that is based on the previous state of f(i) when it was last used for this MIMO transmission mode (and rank) and the time since it was last used.

Described herein is power control for two codeword transmissions in SM-MIMO. Described first is per codeword (CW) power control. When two codewords (CWs) are transmitted over multiple layers (e.g., up to at least 4 layers) in LTE-A UL SM-MIMO, the power control may be defined per codeword or per layer. In the case of per codeword power control, the setting of the WTRU transmit power for the k-th codeword PUSCH (k=1, 2) in subframe i may be defined as follows:

$$P_{PUSCH}(i,k)=\min\{P_{CMAX}, 10\log_{10}(M_{PUSCH}(i))+ P_{O\_PUSCH}(j,k)+\alpha(j)\cdot PL+\Delta_{TF}(i,k)+f(i,k)+ \Delta_{MIMO}(j)\} \quad (2)$$

k=1, 2, where i is the subframe index and k is the codeword index value associated with a transport block.

In Equation (2), $P_{CMAX}$ is the configured WTRU maximum transmit power and could alternatively be defined per codeword, $P_{CMAX}(k)$.

$M_{PUSCH}$ is the bandwidth of the PUSCH resource assignment expressed in the number of resource blocks valid for a subframe. $M_{PUSCH}$ is common to the two CWs.

$P_{O\_PUSCH}(j,k)$ is the codeword specific open loop parameter (in this case, for the k-th CW). This is for handling different targets (e.g., SINR) for different CWs. Particularly, since $P_{O\_PUSCH}$ is composed of the sum of a cell specific nominal parameter, $P_{O\_NOMINAL\_PUSCH}$, and a WTRU specific component, $P_{O\_UE\_PUSCH}$, and the cell specific parameter, $P_{O\_NOMINAL\_PUSCH}$, would be common to both the CWs, different targets for different CWs are reflected in $P_{O\_UE\_PUSCH}(j,k)$. Alternatively, $P_{O\_PUSCH}$ may be common to both the CWs, rather than being CW specific, for example, when the target requirements are the same for the CWs. In that case, the index, k, within the parenthesis in the term $P_{O\_PUSCH}(j,k)$ may be removed.

PL is the pathloss estimate calculated in the WTRU as in LTE. Alternatively (or in the case of per layer power control), PL may be defined per layer (or transmit antenna).

The term $\Delta_{TF}(i,k)$, modulation code factor, is to compensate for the different modulation code schemes (MCS) (than a reference MCS) used for the k-th CW, assuming each CW has its own MCS level which is provided by the eNB. That is, $\Delta_{TF}(i,k)$ is MCS dependent. $\Delta_{TF}(i,k)$ may be defined as:

$$\Delta_{TF}(i,k)=10\log_{10}((2^{MPR(k)\cdot K_S}-1)\beta_{offset}^{PUSCH})$$

for $K_S$=1.25 and $\Delta_{TF}(i,k)$=0 for $K_S$=0, where $K_S$ is given by the WTRU specific parameter deltaMCS-Enabled provided by higher layers, as specified in LTE.

$$MPR(k)=O_{CQI}(k)/N_{RE}(k)$$

is used for control data sent via PUSCH without uplink shared channel (UL-SCH) data (where MPR is modulation×code rating) and $$\sum_{r=0}^{C(k)-1} K_r(k)/N_{RE}(k)$$

is for other PUSCH transmission cases. C(k) is the number of code blocks for the k-th CW, $K_r(k)$ is the size for code block r in the k-th CW, $O_{CQI}(k)$ is the number of CQI bits including cyclic redundancy check (CRC) bits where the CQI bits may be transmitted over the layer(s) associated with the k-th CW. $N_{RE}(k)$ is the number of resource elements determined as:

$$N_{RE}(k)=N_l(k)\cdot M_{SC}^{PUSCH-initial}N_{symb}^{PUSCH-initial},$$

where $N_l(k)$ is the number of layers associated with the k-th CW transmission. $M_{SC}^{PUSCH-initial}$ and $N_{symb}^{PUSCH-initial}$ are common to the two CWs and defined in LTE.

The parameter f(i,k) is the (closed loop) power control adjustment state for the k-th CW if the TPC command is defined per CW. In this case, the TPC commands for the CWs may be signaled separately in physical downlink control channel (PDCCH) or jointly coded/signaled in PDCCH. In either case, a new downlink control indicator (DCI) format may be needed. Alternatively, it may be possible to have a single closed loop TPC command to control the two CWs. In this case, f(i,k) becomes f(i).

$\Delta_{MIMO}(j)$ is as defined previously. Alternatively, $\Delta_{MIMO}(j)$ may be set to zero for SM-MIMO. In that case, $\Delta_{MIMO}(j)$ may be removed from Equation (2).

In UL SM-MIMO transmission, the signals transmitted from multiple layers/antennas may interfere with each other at the base station receiver, that is, cross layer interference may exist. Such cross layer interference causes the effective interference/noise level at the receiver to be increased (equivalently reducing SINR). In this case, the WTRU may need to compensate for the increased interference due to cross layer interference by adjusting its transmit power accordingly. There are several possible methods to compensate for the cross layer interference.

In one example method, a compensation term may be introduced into Equation (2) to compensate for cross layer compensation factor and is reflected in Equation (3):

$$P_{PUSCH}(i,k)=\min\{P_{CMAX}, 10\log_{10}(M_{PUSCH}(i))+ P_{O\_PUSCH}(j,k)+\alpha(j)\cdot PL+\Delta_{TF}(i,k)+f(i,k)+ \Delta_{MIMO}(j)+\Delta_{Int}\} \quad (3)$$

k=1,2 where $\Delta_{Int}$ is a cross layer interference compensation term. The term $\Delta_{Int}$ may be calculated by the WTRU using several UL MIMO relevant parameters that are configured by the base station, for example, the number of ranks/layers, combinations of MCSs for the individual codewords, and/or (relative) power levels of the respective codewords. Alternatively, a look-up table for $\Delta_{Int}$ may be provided by the base station through RRC signaling.

Alternatively, the cross layer interference compensation term may be embedded into Ammo in Equation (3). Alternatively, the cross layer interference terms may be defined per codeword like $\Delta_{Int}(k)$ for k=1,2 where $\Delta_{Int}(k)$ is a function of MIMO transmission mode, including the number of layers/ranks, and the power of the other codeword (i.e. interfering codeword).

When a CW is mapped to more than one layer, then the transmit power for the CW is distributed evenly among the associated layers. Alternatively, the transmit power for the CW may be split relatively among the layers taking into account antenna gain imbalance (AGI) between the antennas, pathloss difference(s) between the antennas, statistics of received TPC commands, and/or other similar factor(s)/metric(s).

If accumulation TPC command is enabled for a WTRU (based on the WTRU-specific parameter Accumulation-enabled provided by higher layers), then when the number of codewords in SM-MIMO is changed (e.g., from two codewords to one codewords or vice versa), the WTRU may reset or adjust the state of the accumulation function, f(i) or f(i,k), in Equation (2) and (3), e.g., the power control algorithm may be adjusted to account for how recent the available information in the accumulation function is, and reset or load f(i) (or f(i,k)) with a value that is based on the previous state of f(i) (or f(i,k)) when it was last used for this MIMO transmission mode (and rank) and the time since it was last used.

Described herein are example maximum power scaling methods for per codeword power control. After calculating the power of each CW (according to Equation (2) or Equation (3)), if the sum of the powers of the two CWs exceeds the WTRU maximum power, $P_{CMAX}$, (i.e., $P_{PUSCH}(i,1)+P_{PUSCH}(i,2)>P_{CMAX}$), then the WTRU adjusts the power of each CW using one of several maximum power scaling methods.

In a first example, assuming that $P_{CMAX}$ is defined as the total WTRU maximum power (regardless of the number of power amplifiers (PAs) in the WTRU), then the transmit powers of $P_{PUSCH}(i,1)$ and $P_{PUSCH}(i,2)$ may be evenly reduced such that the sum of the reduced powers is equal to $P_{CMAX}$. Alternatively, the transmit powers of $P_{PUSCH}(i,1)$ and $P_{PUSCH}(i,2)$ may be reduced by a relative scaling such that $P_{PUSCH}(i,1)=P_{PUSCH}(i,1)-\Delta*(P_{PUSCH}(i,1)/(P_{PUSCH}(i,1)+P_{PUSCH}(i,2)))$ and $P_{PUSCH}(i,2)=P_{PUSCH}(i,2)-\Delta*(P_{PUSCH}(i,2)/(P_{PUSCH}(i,1)+P_{PUSCH}(i,2)))$, where $\Delta$ is the reduction amount required for the maximum power constraint such that $P_{PUSCH}(i,1)+P_{PUSCH}(i,2)=P_{CMAX}$ after the power scaling.

In a second example, the CW may be dropped if its required power level exceeds $P_{CMAX}$ by a predefined threshold. Alternatively, the sum of the powers of the two CWs exceeds the WTRU maximum power, $P_{CMAX}$, $P_{PUSCH}(i,1)+P_{PUSCH}(i,2)>P_{CMAX}$), then one of the CWs is dropped. The dropping may be based on CW priority such as dropping a CW with lower priority.

In a third example, if $P_{CMAX}$ is defined per PA and one CW is transmitted through a single PA (e.g., no layer shift), then no further transmit power adjustment is required.

Described herein are example methods for per PUSCH power control. the WTRU may firstly determine the total WTRU transmit power of PUSCH in SM-MIMO as follows:

$$P_{PUSCH}(i)=\min\{P_{CMAX},10\log_{10}(M_{PUSCH}(i)+P_{O\_PUSCH}(j)+\alpha(j)\cdot PL+q(\Delta_{TF}(i,1),\Delta_{TF}(i,2))+f(i)+\Delta_{MIMO}(j)\} \quad (4)$$

In Equation 4, all the parameters in the above equation as defined in Equation (1), except for $q(\Delta_{TF}(i,1),\Delta_{TF}(i,2))$ where $q(\Delta_{TF}(i,1),\Delta_{TF}(i,2))$ represents a function of $\Delta_{TF}(i,1)$ and $\Delta_{TF}(i,2)$. The terms $\Delta_{TF}(i,1)$ and $\Delta_{TF}(i,2)$ as defined in Equation (2). For example, $q(\Delta_{TF}(i,1), \Delta_{TF}(i,2))=a*\Delta_{TF}(i,1)+b*\Delta_{TF}(i,2)$ where $a>=0$, $b>=0$ satisfying $a+b=2$, for example, $a=1$ and $b=1$ (or satisfying $a+b=1$, for example, $a=0.5$ and $b=0.5$). That is, both $\Delta_{TF}(i,1)$ and $\Delta_{TF}(i,2)$ (i.e., the two MCSs) for codeword 1 and codeword 2, respectively, are taken into account for the calculation of the total power of PUSCH carrying codeword 1 and codeword 2 in SM-MIMO. All the other power control parameters in Equation (4) are common to the two codewords. $\Delta_{MIMO}(j)$ may include the cross layer interference factor, as mentioned previously.

Alternatively, the total transmit power of PUSCH in SM-MIMO may be defined as follows:

$$P_{PUSCH}(i)=\min\{P_{CMAX},10\log_{10}(M_{PUSCH}(i)+P_{O\_PUSCH}(j)+\alpha(j)\cdot PL+\Delta_{TF}(i)+f(i)+\Delta_{MIMO}(j)\} \quad (5)$$

In Equation 5, $\Delta_{TF}(i)$ would be dependent of both MCSs (or combined MCS) of codeword 1 and codeword 2, respectively. For example, $\Delta_{TF}(i)$ could be calculated to take into account the combined impact of the both MCSs. For example, $\Delta_{TF}(i)$ may be defined as:

$$\Delta_{TF}(i)=10\log_{10}((2^{MPR_{12}\cdot K_S}-1)\beta_{offset}^{PUSCH})$$

for $K_S=1.25$ and $\Delta_{TF}(i)=0$ for $K_S=0$, where, $$MPR_{12} = (O_{CQI}(1) + O_{CQI}(2))/(N_{RE}(1) + N_{RE}(2))$$

is used for control data sent via PUSCH without uplink shared channel (UL-SCH) data and $$MPR_{12} = \alpha * \left(\sum_{r=0}^{C(1)-1} K_r(1)/N_{RE}(1)\right) + \beta * \left(\sum_{r=0}^{C(2)-1} K_r(2)/N_{RE}(2)\right)$$

is for other PUSCH transmission cases where $\alpha>=0$, $\beta>=0$ satisfying $\alpha+\beta=1$, for example, $\alpha=0.5$ and $\beta=0.5$ (or satisfying $\alpha+\beta=2$, for example, $\alpha=1$ and $\beta=1$). The terms $C(1)$ and $C(2)$, respectively, are the number of code blocks for codeword 1 and codeword 2, respective. The terms $K_r(1)$ and $K_r(2)$, respectively, are the size for code block r in codeword 1 and codeword 2, respectively. The terms $O_{CQI}(1)$ and $O_{QCI}(2)$, respectively, are the number of CQI bits including cyclic redundancy check (CRC) bits where the CQI bits may be transmitted over the layer(s) associated with codeword 1 and codeword 2, respectively. $N_{RE}(k)$ for $k=1,2$ is the number of resource elements for the k-th codeword, determined as:

$$N_{RE}(k)=N_l(k)\cdot M_{SC}^{PUSCH-initial} N_{symb}^{PUSCH-initial},$$
for $k=1,2$ where $N_l(k)$ is the number of layers associated with the k-th codeword transmission.

The terms:
$$M_{SC}^{PUSCH-initial}, N_{symb}^{PUSCH-initial}$$
are common to the two codewords and defined in LTE. The equation for $\Delta_{TF}(i)$ could also include a term that builds a compensation for cross-layer interference. Alternatively, the cross layer interference may be compensated for through another term configured and signaled by the network (e.g., $\Delta_{MIMO}$, f(i), or other similar terms).

Once the total power is determined according to either Equation (4) or Equation (5), the total transmit power is then distributed equally between the two codewords. Alternatively, different power distribution factors may be used for codeword 1 and codeword 2, respectively. For example, $P_{PUSCH}(i)=c*P_{PUSCH}(i,1)+d*P_{PUSCH}(i,2)$ where $0<=c<=1$, $0<=d<=1$ satisfying $c+d=1$. The power distribution factors, c and d, may be configured semi-statically through higher layer signaling. Alternatively, the WTRU may autonomously determine the power distribution factors, for example, based on PL difference between the CWs (or antennas associated with the CWs), MCS difference between the CWs, AGI, statistics of received TPC commands, or other similar factors or metrics. Alternatively, a semi-static power offset between the two codewords may be used such that $P_{PUSCH}(i,2)=P_{PUSCH}(i)-3-$powerOffset (dBm) and $P_{PUSCH}(i,1)=P_{PUSCH}(i)-3+$powerOffset (dBm) where powerOffset (dB) may be configured through higher layer signaling. Alternatively, the WTRU may autonomously determine the power offset, for example, based on PL difference between the CWs (or antennas associated with the CWs), MCS difference between the CWs, AGI, statistics of received TPC commands, or other similar factors or metrics.

If a codeword is transmitted over multiple layers or antennas, then the codeword power is equally distributed between the layers or antennas. Alternatively, the transmit power for the CW may be split relatively among the layers, taking into account the AGI among the antennas, pathloss difference(s) among the antennas, statistics of received TPC commands, and/or other similar factor(s)/metric(s).

Figure 4:
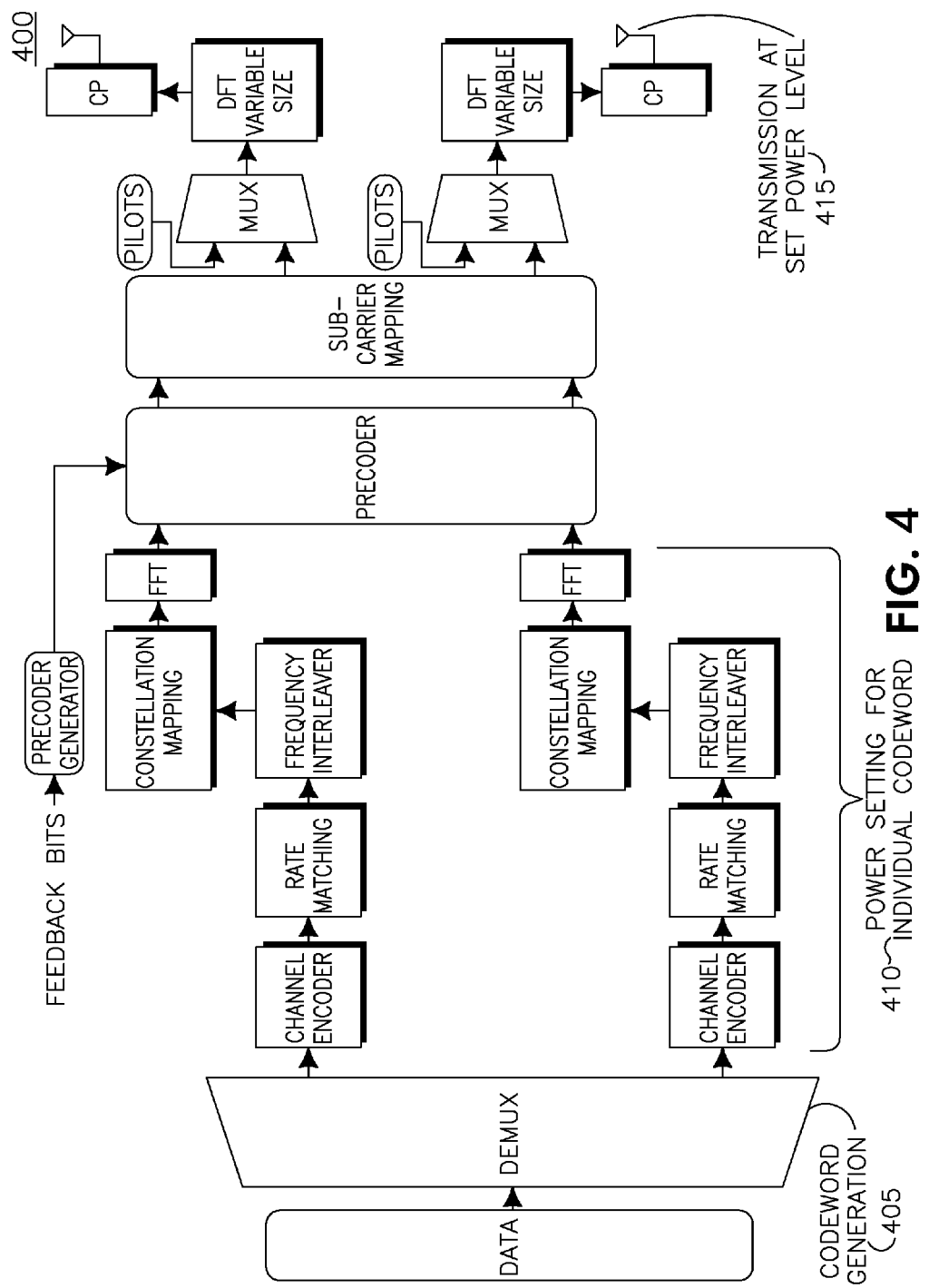
FIG. 4 shows an example double codeword transmitter block diagram.

FIG. 4 shows an example double codeword transmitter block diagram 400 that may use the methods described herein. Transmitter block diagram 400 illustrates a codeword generation block 405 that feeds into a power setting module or circuit 410. Power setting module or circuit 410 uses the methods described herein. The output of the power setting module or circuit 410 is an input into the transmission block 415, where the two codewords are transmitted at the respective determined power levels through the two antennas, respectively.

Described herein are example methods for power control in UL MIMO CoMP. In UL CoMP, there may be multiple PL measurements available from different base stations or relays. Different scenarios are presented on how the WTRU uses PL measurements.

In scenario 1, the WTRU does not know it is in CoMP in the UL. The WTRU may not be aware that it is in UL CoMP. From a WTRU perspective, there may be no modifications required for the WTRU procedure. However, in UL CoMP where multiple cells receive the UL signal, the anchor or primary cell (which sends the PDCCH to the WTRU) sends the WTRU TPC command which may be based on received signal measurements (e.g., after combing all the UL signals) from all the cooperative cells.

Alternatively, all the cooperative cells may generate their own TPC command and send them to the anchor cell. The anchor cell combines the received TPC commands (from non-anchor cells) and then generates a single TPC command, which will be sent to the WTRU. This method may be applicable to cases described below.

When the WTRU enters UL CoMP mode and if accumulation is enabled, the base station may send the WTRU an indicator to reset the accumulation function f(i), where the indicator may be signaled via L1/2 or higher layers. Upon receiving the indicator, the WTRU may reset f(i).

Alternatively, when the WTRU enters UL CoMP mode, the anchor cell may update $P_{O\_PUSCH}$ and send it (even the value of $P_{O\_UE\_PUSCH}$ is not changed) to the WTRU. Upon receiving $P_{O\_UE\_PUSCH}$, the WTRU may reset accumulation f(i), if accumulation is enabled or if the TPC command is included in a PDCCH with DCI format 0.

In scenario 2, the WTRU knows it is in CoMP in UL, but not told which other base stations or relays may be listening. Path loss measurements from other nearby base stations or relays may be made by the base stations. No TPC bits are sent from other base stations or relays that may be listening. Base stations determine the effective PL (e.g., in terms of the same block error probability) assuming that the both own cell and best non-own cell(s) device is listening to the transmission. The method to combine the PL measurements may in principle depend on the type of combining done at the base stations or relays (e.g., no combining, soft combining, . . . ). For example, the PL definition may be modified where the PL is the downlink pathloss estimate calculated in the base stations in dB, and in the case of UL CoMP, the PL of multiple cells may be combined.

The PL(i)=referenceSignalPower(i)−higher layer filtered RSRP(i), where referenceSignalPower(i) is provided by higher layers for each cell I, and RSRP is defined for each cell(i) and the higher layer filter configuration is defined in LTE.

The combining may be done in several ways. In one method, the minimum value is used, e.g., PL=min{PL(i)} i=1 . . . N. In another method, the PL may be defined as equal gain combining, PL=1/N*(Sum of PL(i)).\

When the WTRU knows that it enters UL CoMP mode and if accumulation is enabled, the WTRU may reset f(i).

In scenario 3, the WTRU knows it is in CoMP in UL and knows at least one other listener. The path loss measurements from other nearby base stations or relays are made by the WTRU for the cells participating in UL CoMP. TPC bits are sent from other base stations or relays that may be listening. The TPC bits may be physically sent to WTRU from a single point and included in a single PDCCH. The WTRU may maintain a power control loop for each CoMP UL target and combine the computed required power for the UL transmission. A combining method may be to select the smallest power, with a possible additional offset. For example, the required UL power is computed for each cell in UL CoMP (k) as:

$$P_{PUSCH}(i)_k = \min\{P_{MAX}, 10\log_{10}(M_{PUSCH}(i)) + P_{O\_PUSCH}(j) + \alpha(j) \cdot PL_k + \Delta_{TF}(i) + f(i)_k\}$$

and the final computed required power (before any backoff) is then:

$$P_{PUSCH}(i) = \min\{P_{PUSCH}(i)_k\} - \Delta_{CoMP} \quad k=1 \ldots K$$

where K is the number of participating cell in UL CoMP and $\Delta_{CoMP}$ is a parameter (or a table in the event that $\Delta_{CoMP}$ is a function of K) provided by higher layers.

When the WTRU knows that it enters UL CoMP mode and if accumulation is enabled, the WTRU shall reset f(i).

Alternatively, when the WTRU enters UL CoMP mode (including all the above three cases), the anchor cell shall update $P_{O\_UE\_PUSCH}$ and send it (even the value of $P_{O\_UE\_PUSCH}$ is not changed) to the WTRU. Upon receiving $P_{O\_UE\_PUSCH}$, the WTRU may reset accumulation f(i), if accumulation is enabled or if the TPC command is included in a PDCCH with DCI format 0.

For a WTRU in uplink CoMP, the base station from where it receive its uplink scheduling grant is called the anchor base station for this WTRU.

The following methods may be used for path loss metric in UL power control for WTRU in uplink CoMP for the path loss used in the uplink power control formula. In one example, the weighted average of path loss from different base stations may be used. The path loss from the anchor base station has the largest weight, and non-anchor base stations have the same weight, which is smaller than the weight of the anchor base station. Alternatively, equal weights may be used.

In another example, only the path loss from the anchor base station may be used and does not include path loss from non-anchor base statiosn in the TPC formula. In yet another example, the best (e.g., smallest) path loss may be used and does not include other path losses in the TPC formula. In still another example, the worst (e.g., largest) path loss may be used and does not include other path losses in the TPC formula.

The transmit power control command for the WTRU in uplink CoMP may be generated by each base station in the uplink CoMP active set. TPC commands sent by those non-anchor base stations may only be in accumulation mode. TPC commands sent by the anchor base station may be in either absolute or accumulation mode. There are several ways for the WTRU to combine TPC commands received from different base stations. In one method, a voting method may be used. In one option of the voting method, a majority vote may be used. In another option, the anchor base station has an overrule priority.

In another method, a weighted average may be used. The TPC command from the anchor base station has the largest weight, and non-anchor base stations have the same weight, which is smaller than the weight of the anchor base station. Alternatively, the TPC command from each base station may be weighted according to its path loss (normalized to the best path loss). That is, the TPC command from the strongest cell (with the smallest path loss) has the largest weight and so on. In another alternative, equal weights may be used across all base stations.

Described herein are signaling/configuration/procedure aspects for CoMP that may affect UL power control. Both downlink (DL) CoMP and UL CoMP may be supported in LTE-A and example methods are provided when the WTRU is in both DL CoMP and UL CoMP simultaneously. In a first case, only one CoMP configuration is used in RRC signaling for both UL/DL. That is, if the WTRU receives RRC signaling to inform the WTRU is in CoMP, the WTRU is automatically in both DL CoMP and UL CoMP simultaneously. Procedure for UL power control for UL CoMP assuming DL is also in CoMP should be used.

In a second case, separate CoMP configurations may be used for UL and DL. In this case, separate RRC signalings and configurations may be used, one for DL CoMP and one for UL CoMP. WTRU receives RRC signaling to inform the WTRU if it is in CoMP or not in either UL, DL or both UL/DL. If the WTRU is in UL CoMP but not in DL CoMP, procedure for UL power control for UL CoMP assuming DL is not in CoMP should be used. If the WTRU is not in UL CoMP but in DL CoMP, procedure for UL power control for non-UL CoMP assuming DL is in CoMP should be used. If the UE is in CoMP for both UL/DL, it is similar to case 1 and procedure for UL power control for UL CoMP assuming DL is also in CoMP should be used. Otherwise procedure for UL power control for non-CoMP for both UL/DL should be used.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method for uplink power control in a multiple-input multiple-output (MIMO)-capable wireless transmit/receive unit (WTRU) having two antenna ports, comprising:
   the WTRU receiving a first antenna configuration indication indicating to the WTRU to use one antenna port for transmission;
   the WTRU transmitting, via one of the two antenna ports, a first uplink subframe at a first total uplink transmission power;
   the WTRU receiving a second antenna configuration indication instructing the WTRU to enter a MIMO mode using two antenna ports for transmission in the MIMO mode;
   the WTRU receiving a total uplink transmission power offset associated with the second antenna configuration indication to use for uplink transmissions when configured in the MIMO mode, wherein the total uplink transmission power offset is specific to the WTRU and indicates a value of power by which to adjust the first total uplink transmission power; and
   the WTRU transmitting, via the two antenna ports and in the MIMO mode, a second uplink subframe at a second total uplink transmission power, wherein the second total uplink transmission power is offset from the first total uplink transmission power by the value indicated by the total uplink transmission power offset;
   wherein the total uplink transmission power offset directly offsets a total power of a transmission of an uplink subframe that is spread across all antennas employed in the transmission of the uplink subframe by the value indicated by the total uplink transmission power offset.

2. The method of claim 1, wherein the total uplink transmission power offset is for a physical uplink shared channel (PUSCH) transmission in a subframe.

3. The method of claim 1, further comprising determining the total uplink transmission power offset per codeword (CW) per subframe.

4. The method of claim 1, wherein the total uplink transmission power offset is received via radio resource control (RRC) signaling.

5. The method of claim 1, wherein the total uplink transmission power offset is selected from a set of two total uplink transmission power offsets corresponding to a number of employed transmission antennas, wherein a first total uplink transmission power offset of the set of two total uplink transmission power offsets is used on a condition only one antenna is employed for transmission and wherein a second total uplink transmission power offset of the set of two total uplink transmission power offsets is used on a condition exactly two antennas are employed for transmission.

6. The method of claim 1, wherein the total uplink transmission power offset is part of an open loop parameter.

7. The method of claim 1, further comprising resetting an accumulation function upon WTRU reconfiguration from a first transmission mode using the one of the two antenna ports to a second transmission mode using the two antenna ports.

8. The method of claim 1, wherein the total uplink transmission power offset is used to adjust for rank adaptation.

9. The method of claim 8, further comprising resetting an accumulation function upon rank adaptation.

10. The method of claim 1, wherein the total uplink transmission power offset is −2 dB.

11. The method of claim 10, wherein the MIMO mode is Transmit (Tx) Diversity.

12. The method of claim 1, wherein the total uplink transmission power offset includes a cross layer interference compensation factor.

13. The method of claim 1, wherein a transmit power level for a codeword is distributed evenly across layers to which the codeword is mapped.

14. The method of claim 1, further comprising determining the first and the second total uplink transmission power using an uplink transmit power control formula that includes a transmission mode power offset.

15. A multiple-input multiple-output (MIMO)-capable wireless transmit/receive unit (WTRU) configured to control total uplink transmission power, comprising:
    two antenna ports;
    a receiver configured to:
        receive a first antenna configuration indication indicating to the WTRU to use one antenna port for transmission;
        receive a second antenna configuration indication instructing the WTRU to enter a MIMO mode using two antenna ports for transmission in the MIMO mode; and
        receive a total uplink transmission power offset associated with the second antenna configuration indication to use for uplink transmissions when configured in the MIMO mode, wherein the total uplink transmission power offset is specific to the MIMO-capable WTRU and indicates a value of power by which to adjust a first total uplink transmission power; and
    a transmitter coupled to the two antenna ports, the transmitter configured to:
        transmit, via one of the two antenna ports, a first uplink subframe at the first total uplink transmission power; and
        transmit, via the two antenna ports and in the MIMO mode, a second uplink subframe at a second total uplink transmission power, wherein the second total uplink transmission power is offset from the first total uplink transmission power by the value indicated by the total uplink transmission power offset;
    wherein the total uplink transmission power offset directly offsets a total power of a transmission of an uplink subframe that is spread across all antennas employed in the transmission of the uplink subframe by the value indicated by the total uplink transmission power offset.

16. The MIMO-capable WTRU of claim 15, wherein the total uplink transmission power offset is for a physical uplink shared channel (PUSCH) transmission in a subframe.

17. The MIMO-capable WTRU of claim 15, further comprising a processor configured to determine the total uplink transmission power offset per codeword (CW) per subframe.

18. The MIMO-capable WTRU of claim 15, wherein the receiver is further configured to receive the total uplink transmission power offset via radio resource control (RRC) signaling.

19. The MIMO-capable WTRU of claim 15, wherein the total uplink transmission power offset is selected from a set of two total uplink transmission power offsets corresponding to a number of employed transmission antennas, and wherein the transmitter is further configured to:
    use a first total uplink transmission power offset of the set of two total uplink transmission power offsets on a condition only one antenna is employed for transmission; and
    use a second total uplink transmission power offset of the set of two total uplink transmission power offsets on a condition exactly two antennas are employed for transmission.

20. The MIMO-capable WTRU of claim 15, wherein the total uplink transmission power offset is part of an open loop parameter.

21. The MIMO-capable WTRU of claim 15, further comprising a processor configured to reset an accumulation function upon WTRU reconfiguration from a first transmission mode using the one of the two antenna ports to a second transmission mode using the two antenna ports.

22. The MIMO-capable WTRU of claim 15, wherein the total uplink transmission power offset is used to adjust for rank adaptation.

23. The MIMO-capable WTRU of claim 22, further comprising a processor configured to reset an accumulation function upon rank adaptation.

24. The MIMO-capable WTRU of claim 15, wherein the total uplink transmission power offset is −2 dB.

25. The MIMO-capable WTRU of claim 24, wherein the MIMO mode is Transmit (Tx) Diversity.

26. The MIMO-capable WTRU of claim 15, wherein the total uplink transmission power offset includes a cross layer interference compensation factor.

27. The MIMO-capable WTRU of claim 15, wherein a transmit power level for a codeword is distributed evenly across layers to which the codeword is mapped.

28. The MIMO-capable WTRU of claim 15, further comprising a processor configured to determine the first and the second total uplink transmission power using an uplink power control formula that includes a transmission mode power offset.

* * * * *